Patented Dec. 31, 1935

2,025,777

UNITED STATES PATENT OFFICE 2,025,777

METHOD OF MAKING FUEL BRIQUETTES

Arthur A. Roberts, London, England; Arthur Roberts, Wanstead, England, and Clifford Wilbur Smith, Maida Vale, England, administrators of said Arthur A. Roberts, deceased No Drawing. Application November 2, 1933, Serial No. 696,438. In Great Britain October 26, 1932

2 Claims. (Cl. 44—19)

The present invention relates to improvements in the manufacture of artificial fuel in the form of blocks or briquettes from carbonaceous material such as coal, coke sawdust, tan bark, peat, lignite, anthracite, carbonaceous residuums and the like materials.

The binder or one of the binders generally employed for the agglomeration of the particles of carbonaceous fuel is bitumen, or asphalt, or bituminous material resulting from the destructive distillation of carbonaceous materials such as coal. The expression bituminous, therefore, includes tarry matters resulting from destructive distillation processes as well as those naturally occurring.

The distribution of such a bituminous binder throughout the particles of carbonaceous material sometimes presents difficulty, especially when these particles are moistened as, for example when moisture is present for the purpose of bringing about the setting of hydraulic cement employed as an additional binder.

According to the present invention, therefore, the bituminous binder is distributed throughout the mass of particles of carbonaceous material in the form of an aqueous emulsion. The aqueous medium of the emulsion may then contain, in solution, a substance or substances adapted to increase the intensity of combustion such as boric acid, sodium chloride, potassium salts, and the like in quantity not usually exceeding one per cent. This is particularly desirable in many cases since the bituminous binder has a retarding effect upon the rate of combustion of the carbonaceous fuel.

The present invention is of particular importance where the bituminous binder is employed in conjunction with hydraulic cement. The preferred method of incorporating these binders consists in mixing the hydraulic cement dry with the particles of carbonaceous material, whereupon an aqueous medium is added in sufficient quantity to bring about setting of the cement. This aqueous medium is either additional to or may be the aqueous emulsion of the bituminous binder.

By adding the bituminous binder in the form of an aqueous emulsion, it is permitted to penetrate readily between the moistened particles and be distributed uniformly throughout the mass of fuel. The aqueous emulsion may be blown into the mass of particles to be briquetted by means of a gas or vapor, such as steam.

In so far as the aqueous emulsion may be blown into the mass of carbonaceous particles immediately after its production, its stability is not a matter of great consequence. It is merely necessary for the particles of bituminous substance to remain dispersed in the aqueous medium sufficiently long to ensure adequate distribution throughout the mass of fuel. It may then be coagulated upon the particles to exert its binding effect. The aqueous emulsion may contain a small proportion of starch as an emulsifying agent and is preferably prepared hot, e. g. by heating a suitable proportion of water, then adding starch, then heating again and then adding the bitumen which may be previously molten and bringing about the emulsification by stirring or other agitation. The amount of starch may be ½% by weight of the coal and if desired caustic soda or other known emulsifying agents may be employed in addition to or instead of the starch.

A suitable bituminous material to employ is that known under the trade-mark "Mexphalt" of 40 to 50° penetration (Penetrometer scale). The amount preferably does not exceed 7% of the total weight of carbonaceous material.

The binders may be distributed throughout the mass of fuel particles by water and the briquettes, after moulding, may be heated for a short time at a temperature not exceeding 500° C.

The hydraulic cement of commerce not exceeding 5% by weight may in certain cases be used additionally to bitumen as a binding material, this cement being mixed dry with or ground into the coal in its reduction to powdered form.

In preparing the emulsion the proportion of starch, usually one half per cent by weight of the coal, is mixed with enough cold water to make a smooth paste. The sodium chloride is then added and the whole is mixed with as many gallons of boiling water as the number of pounds of starch. It is essential that the water be boiling. The emulsion is then poured into a mixer and mixed in with the powdered coal together with such additional water as normally amounts to 1¼ times by weight of the weight of the cement and bitumen binder, together whereby the bituminous binder and the cement when this is used, is thoroughly distributed throughout the granules of the coal.

I declare that what I claim is:—

1. A method of making fuel briquettes, consisting in mixing powdered carbonaceous combustible with hydraulic cement in a dry state, dissolving a combustion-controlling agent in water and preparing from said solution an aqueous emulsion of bitumen, in the presence of starch as an emulsifying agent, wetting the mixed carbonaceous combustible and cement by means of said aqueous emulsion, and then moulding briquettes from said wetted mixture, the water of said emulsion being sufficient to effect the hydration and setting of said cement and amounting substantially to one and one-fourth times the combined weight of cement and bitumen.

2. A method of making fuel briquettes, consisting in mixing powdered carbonaceous combustible with hydraulic cement in quantity not exceeding five percent to the weight of combustible in a dry state, dissolving a combustion-controlling agent in water and preparing from said solution an aqueous emulsion of bitumen, in the presence of starch in the proportion of substantially one-half of one percent to the weight of combustible as an emulsifying agent, wetting the mixed carbonaceous combustible and cement by means of said aqueous emulsion, and then moulding briquettes from said wetted mixture, the water of said emulsion being sufficient to effect the hydration and setting of said cement and amounting substantially to one and one-fourth times the combined weight of cement and bitumen.

ARTHUR A. ROBERTS.